Patented Mar. 8, 1927.

1,620,303

UNITED STATES PATENT OFFICE.

WILLIAM H. UHRIG, OF ST. LOUIS, MISSOURI.

PROCESS FOR PREPARING FEATHERS FOR BEDDING AND THE LIKE.

No Drawing.   Application filed September 8, 1924.   Serial No. 736,664.

This invention relates to a process for preparing feathers for use in bedding and the like.

In the use of feathers for bedding and the like, the quality of natural feathers differs widely. Those feathers which come from certain parts of the body of certain fowls, as, for instance, the lower body feathers of geese and ducks, are of relatively fine texture, soft and pliable, and when made up into pillows or bedding provide a very fine article which is soft and yet resilient. These feathers are ordinarily called "down" and are of considerable value for this purpose.

Feathers from other parts of the body of the fowl are larger and are provided with a stem or quill which is more or less stiff and unyielding. These feathers are considerably less valuable for bedding on account of their stiffness and unyielding qualities which makes the bedding stuffed with them correspondingly hard and unyielding.

One of the objects of this invention, therefore, is to provide a method for treating feathers so as to remove the quill portions in order to render the mass of feathers more yielding and pliable.

Another object is to provide a method in which the quill portions are treated so as to render the same more easily removable.

Another object is to provide a process in which the feathers are rendered softer and more pliable, and in which the same are also deodorized.

Another object is to provide a process whereby a cleaner product may be obtained.

Further objects will appear from the detail description.

In accordance with this invention practically any kind of feathers may be treated, and the same is particularly adapted to the treatment of ordinary poultry feathers. The feathers are first thoroughly cleaned and treated for the purpose of rendering the quill portions easily pulverizable. This treatment may consist in a suitable chemical treatment and drying, or simply in drying the feathers thoroughly.

It is desirable to first give the feathers a thorough washing to free them of the dirt, blood and the other organic matter with which they ordinarily become contaminated during previous handling. This preliminary cleansing may be effectively carried out by washing the feathers with soda. The so-called "washing soda" or sodium carbonate may be used for the purpose with good effect. After a thorough washing with soda the feathers are rinsed through several changes of clean water so as to remove all traces of the soda. This washing frees the feathers from practically all dirt and organic matter. The feathers may then be put into a centrifuge to extract the greater part of the moisture, after which they are thoroughly dried.

In carrying out the drying step of the process the feathers may be treated in any suitable form of drying drum, the apparatus ordinarily used comprising a drum of perforated sheet metal, wire mesh or similar material which will permit the passage of air therethrough. Within this drum the feathers may be agitated while a gentle draft of heated air is passed therethrough. The apparatus is so arranged that the feathers remain in the drum until thoroughly dried, whereupon they are removed therefrom. In one type of apparatus an opening is provided in the drum at an elevation above the bottom thereof. As the feathers become thoroughly dried, they acquire a tendency to float on the draft of air which then carries them upward and out of the opening. In this step of the process the feathers are thoroughly dried so that all moisture is removed not only from the vane or web portions thereof, but the quill portions are also thoroughly dried so as to render the same brittle in preparation for the subsequent steps. The treatment with soda also helps, by removing some of the oil, to render the quills brittle when dry.

After treating as above described, the feathers may be passed through a suitable grinder in order to pulverize the quill portions. Any suitable type of grinder may be used which will grind fine enough to pulverize the quills. A Mead grinder, such as used for pulverizing roots, herbs and the like, has been used for this purpose with success. The Williams pulverizer in which the material is passed over a grid of sharp-edged angular bars and beaten by revolving hammers is also effective when adjusted to grind fine enough. In this operation the quill portions are completely comminuted so as to practically pulverize the same. Not only are the quills completely reduced but the vane or web portions may also be broken up so that the barbs are actually separated from one another. The barbs themselves, however, remain intact so that this portion of the feather retains its original texture and pliability. This step of the process may also be carried out under the action of heated air so as to maintain the feathers thoroughly dried.

When the quill portions have been pulverized, they are separated and removed from the remaining portions of the feathers. This may be carried out by any suitable means as, for instance, by agitating the material under the influence of heat in a chamber enclosed by fine wire mesh or similar material, whereby the quill dust is driven off through the mesh while the feathers are retained. This process is in common use for renovation of feathers. This procedure may be repeated if necessary so that all of the quill dust is entirely removed from the material. The remaining part consists then only of the light, fluffy parts of the feathers which are ordinarily of practically the same quality as ordinary down. Or the separation may be carried out by passing the feathers through a separating chamber on a slowly moving body of air whereby the pulverized quills will be removed from the barbs by gravity settling.

The removal of the ground quill portions from the feathers also has the effect of decidedly reducing any disagreeable odors which the original material may have. There is, therefore, a deodorizing process which accompanies the removal of the quill portions.

After removing the quills the feathers are again washed with soda. This removes the last traces of dirt and thoroughly cleans and deodorizes the feathers. They are then rinsed through several changes of clean water and thoroughly dried as previously described.

It will be seen, therefore, that in accordance with this invention a process is provided in which ordinary poultry feathers may be treated so as to render the same soft and fluffy and of a quality comparable with ordinary down. It has been found that such coarse feathers as the wing and tail feathers of chickens may be successfully treated by this process. The preliminary treatment to render the quill portions brittle insures the thorough pulverization of the same and separation of the same from the main portions so that the subsequent removal of the quill portions is rendered easy. Such subsequent removal then not only removes all the hard and unyielding material from the feathers but also removes a greater portion of the disagreeable odors. The final washing and drying removes all dirt and odors and leaves only clean down. The resulting material is, therefore, as clean and soft and pliable as the ordinary down and its value is correspondingly enhanced.

It is obvious that various changes may be made in details without departing from the spirit of this invention; it is, therefore, to be understood that this invention is not to be limited to the specific details described.

Having thus described the invention, what is claimed is:

1. The process of preparing feathers for bedding and the like, comprising, treating the feathers so as to render the quills brittle, grinding the feathers so as to detach the barbs from the quills and pulverize the quills and separating the barbs from the quills.

2. The process of preparing feathers for bedding and the like, comprising, pulverizing the quills, and passing the feathers through a chamber on a slowly moving body of air, whereby the pulverized quills are removed from the barbs by gravity settling.

3. The process of preparing feathers for bedding and the like, comprising, treating the feathers so as to render the quills brittle, grinding the feathers so as to detach the barbs from the quills and pulverize the quills and passing the feathers through a chamber on a slowly moving body of air, whereby the pulverized quills are removed from the barbs by gravity settling.

4. The process of preparing feathers for bedding and the like, comprising, washing the feathers with soda and drying the same so as to render the quills brittle, grinding the feathers so as to detach the barbs from the quills and pulverize the quills and separating the barbs from the quills.

5. The process of preparing feathers for bedding and the like, comprising, washing the feathers with soda, drying the feathers, pulverizing the quills, separating the pulverized quills from the barbs, washing the separated barbs with soda and drying the washed barbs.

6. The process of preparing feathers for bedding and the like, comprising, washing the feathers with soda, rinsing the feathers, drying the feathers, pulverizing the quills, separating the pulverized quills from the barbs, washing the separated barbs with soda, rinsing the barbs and finally drying the barbs.

In testimony whereof I affix my signature this 3rd day of September, 1924.

WILLIAM H. UHRIG.